2,948,743
Patented Aug. 9, 1960

2,948,743

OXO-ALUMINUM ACYLATES, ALKOXIDES AND PHENOXIDES

Jacobus Rinse, Bernardsville, N.J., assignor to J. W. Ayers & Co., Easton, Pa., a corporation of Delaware No Drawing. Filed Sept. 8, 1955, Ser. No. 533,235

Claims priority, application Netherlands Sept. 11, 1954

9 Claims. (Cl. 260—414)

This invention relates to oxo-aluminum derivatives of alkoxy- and phenoxy aluminum acylates and their polymerization products and also to methods of producing the same. Broadly considered, the process of the invention involves the heating of alkoxy- or phenoxy aluminum acylates (hereinafter referred to collectively as "R-oxy" aluminum acylates) to a temperature at which an ester splits off thereby providing an oxo-aluminum compound.

An object of the invention is to produce a new class of highly active reagents for paints and other coatings. Another object is to provide novel aluminum compounds readily reactive with hydroxy and carboxy compounds upon warming or heating but which react slowly, if at all, under cool or atmospheric temperatures.

The acylate radical in the R-oxy aluminum acylates used as the starting material in the process of the invention may be derived from any monocarboxylic acid. For the production of oxo-aluminum acylates those containing fatty acid radicals are of greatest utility, those of unsaturated character being preferred. The acid radical, however, may contain any number of carbon atoms and may be saturated or unsaturated, straight chained or branched. The oxo-aluminum acylates derived from higher molecular unsaturated fatty acids such as oleic and linoleic acid are ordinarily highly viscous to pasty substances. The corresponding compounds produced from higher saturated fatty acids as those containing from 8 to 18 carbon atoms are fusible solid substances. The oxo-aluminum acylates derived from lower molecular fatty acids with fewer than 8 carbon atoms are not fusible but in view of their solubility in organic solvents, as for example, aromatic hydrocarbons they may be used in the same way. They generally have the same or similar reactive capacity.

The R-oxy group of the starting material used in the preparation of the oxo-aluminum acylate preferably is the isopropoxide, for it is readily available. Other suitable alkoxides are the ethoxide, the normal-propoxide, the normal- and iso-butoxides and pentoxides, the phenoxides, cresoxides and, as well, other alkoxides of relatively low boiling alcohols and phenols. Alkoxides of lower molecular alcohols are preferred.

The oxo-aluminum acylates may be obtained simply by heating any of the R-oxy aluminum acylates herein described to a temperature at which an ester is split off, which temperature generally lies between 200° and 300° C.

The mono, R-oxy aluminum diacylate from which the oxo-aluminum acylates are produced may have two acylate radicals of the same structure, but in a special embodiment where an oxo-aluminum acylate of a higher molecular weight acid is desired, the starting material contains an acyl radical of a lower molecular fatty acid and hence only one acyl radical of higher molecular weight. When this mixed acylate is used, an ester is formed by the R-oxy group and the acyl group of the lower fatty acid as the by-product, and since the boiling point of the ester is relatively low, it can be readily distilled off when it is desired to produce an oxo-aluminum acylate in relatively pure state. It should be understood, however, that purified oxo-aluminum acylates can be obtained without the use of mixed acylates as the starting material, but the help of a vacuum during distillation may be required. It should also be understood that for some of the uses contemplated, the presence of the ester in the product with the oxo-aluminum compound is not objectionable, and distillation is not required to provide an adequately reactive mass.

The oxo-aluminum compounds of the invention have outstanding activity in addition reactions and combine with many substances including acids, alcohols, phenols, hydroxy acids, glycols and other polyvalent alcohols and water and also various macromolecular substances containing one or more hydroxy or carboxy groups. These additions proceed substantially according to the following equations:

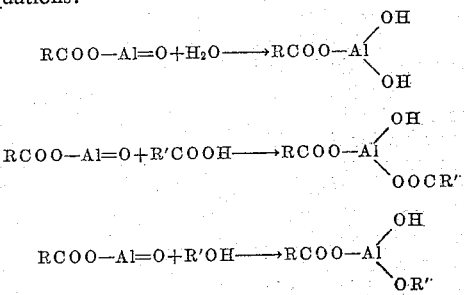

These addition reactions do not take place at any appreciable rate at room temperature but react readily by heating, for example at about 100° C. During this reaction there may occur a considerable increase in viscosity which often leads to a mixed product which gelatinizes or completely sets.

The pure oxo-aluminum compounds of the present invention as well as the impure products containing the ester by-products may be used in many fields where their high reactivity is a factor. They may be employed, for example, in the manufacture of paint, printing ink and bituminous products. They also may be employed as textile improvement agents, for example for rendering textile material impermeable, and as plasticizers for plastic substances and cellulose derivatives.

In most of the following examples, processes for the production of the R-oxy aluminum acylates used as starting materials are set out. Some of the starting materials may not be available commercially and besides the production of the oxo-aluminum compounds from the starting materials may follow the production of the starting materials in such manner as to appear to be a mere continuation of the heating operation.

Example 1

Aluminum isopropoxide in a quantity of 204 gm. is heated to and maintained at 180° C. while 560 gm. of oleic acid are introduced and slowly mixed therewith. During this heating 120 gm. of isopropanol are distilled off.

The isopropoxy oleate compound obtained is thereupon heated to 260° C. and maintained under these conditions for about 1 hour. By vacuum distillation about 300 gm. of oleic acid isopropyl ester are distilled off, leaving about 330 gm. of oxo-aluminum oleate.

Example 2

Aluminum isopropoxide in the amount of 204 gm. are heated together with 280 gm. of oleic acid at a temperature of 180° C. until 60 gm. of isopropanol have been distilled off. The reaction mass is then cooled to a temperature below 100° C. whereupon 60 gm. of acetic acid are added and the mixture is again heated and its temperature raised to 200° C. and maintained there until up to 60 gm. of isopropanol are liberated.

The isopropoxy aluminum acetate oleate product obtained is thereupon heated to 260° C. at which temperature the acetic acid ester of isopropanol formed distills off. After 3 hours of heating a reaction mass is obtained consisting of about 340 gm. of oxo-aluminum oleate.

*Example 3*

Aluminum isopropoxide in the amount of 204 gm. is melted and heated to a temperature of 150° to 200° C. Thereupon 288 gm. of ethyl hexoic acid are gradually added. The heating is continued until 120 gm. of isopropanol and a smaller amount of ethyl hexoic acid ester of isopropanol have distilled off.

The mono-isopropoxy aluminum acylate compound obtained is thereupon heated to and maintained at a temperature of 260° C. until about 180 gm. of the ethyl hexoic acid ester of isopropanol have been distilled off, whereby a residue is obtained composed of about 190 gm. of oxo-aluminum octoate.

From the reaction equations and examples hereinbefore set out, it is evident that the process of the invention may be alternatively or conjointly used for the purpose of producing esters, as for forming phenyl acetate.

The oxo-aluminum acylates of the invention are particularly active for the gelling of gasoline and for the modification of asphalt, paraffin, micro-crystalline wax, and other like products. These acylates and particularly the oxo-aluminum stearate are suitable for the preparation of greases by reaction of the same with stearic acid in the presence of lubricating oil. For example, a grease can be formed by heating 100 parts of mineral oil with 4 parts of oxo-aluminum stearate and 4 parts of stearic acid at 120° to 130° C. until a highly viscous gel is obtained. On cooling a grease of highly desirable properties is obtained.

It should be understood that the present invention is not limited to the specific compounds and procedures disclosed herein but that it extends to all equivalents which will occur to those skilled in the art upon consideration of the teachings herein and the claims appended hereto.

I claim:

1. A process for the production of oxo-aluminum carboxylates which comprises reacting an aliphatic monocarboxylic acid free of any functional groups which would interfere with the reaction herein specified with an aluminum R-oxide in the mol proportion of substantially 1:1 during heating of the reaction mixture at a temperature of at least 150° C. whereby R-hydroxide is liberated, continuing the heating until one mol proportion of the R-hydroxide has distilled off, adding an additional mol proportion of the monocarboxylic acid to the reaction mass, heating the reaction mass at a temperature of at least 150° C. until an additional mol proportion of R-hydroxide is liberated by the reaction and distilled off, heating the resulting reaction mass to a higher temperature of at least 200° at which ester is liberated and continuing the heating until a total of substantially one mol proportion of ester has been liberated by the reaction, said R radicals being selected from the group consisting of hydrocarbon radicals of alcohols and phenols of a volatility permitting vaporization of the R-hydroxide formed in the steps hereinbefore specified.

2. A process for the production of oxo-aluminum carboxylates which comprises reacting an aliphatic monocarboxylic acid free of any functional groups which would interfere with the reaction herein specified with an aluminum isopropoxide in the mol proportion of substantially 1:1 during heating of the reaction mixture at a temperature of at least 150° C. whereby isopropyl alcohol is liberated, continuing the heating until one mol proportion of the isopropyl alcohol has distilled off, adding an additional mol proportion of the monocarboxylic acid to the reaction mass, heating the reaction mass at a temperature of at least 150° C. until an additional mol proportion of isopropyl alcohol is liberated by the reaction and distilled off, heating the resulting reaction mass to a higher temperature of at least 200° at which ester is liberated and continuing the heating until a total of substantially one mol proportion of ester has been liberated by the reaction.

3. A process for the production of oxo-aluminum carboxylates which comprises reacting a fatty acid having at least 8 carbon atoms, said monocarboxylic group being free of any functional group which would interfere with the reaction herein specified with an aluminum R-oxide in the mol proportion of substantially 1:1 during heating of the reaction mixture at a temperature of at least 150° C. whereby R-hydroxide is liberated, continuing the heating until one mol proportion of the R-hydroxide has distilled off, adding an additional mol proportion of the fatty acid to the reaction mass, heating the reaction mass at a temperature of at least 150° C. until an additional mol proportion of R-hydroxide is liberated by the reaction and distilled off, heating the resulting reaction mass to a higher temperature of at least 200° at which ester is liberated and continuing the heating until a total of substantially one mol proportion of ester has been liberated by the reaction, said R radicals being selected from the group consisting of hydrocarbon radicals of alcohols and phenols of a volatility permitting vaporization of the R-hydroxide formed in the steps hereinbefore specified.

4. A process for the production of oxo-aluminum carboxylates which comprises reacting a fatty acid having at least 8 carbon atoms, said monocarboxylic group being free of any functional group which would interfere with the reaction herein specified with an aluminum isopropoxide in the mol proportion of substantially 1:1 during heating of the reaction mixture at a temperature of at least 150° C. whereby isopropyl alcohol is liberated, continuing the heating until one mol proportion of the isopropyl alcohol has distilled off, adding an additional mol proportion of the fatty acid to the reaction mass, heating the reaction mass at a temperature of at least 150° C. until an additional mol proportion of isopropyl alcohol is liberated by the reaction and distilled off, heating the resulting reaction mass to a higher temperature of at least 200° at which ester is liberated and continuing the heating until a total of substantially one mol proportion of ester has been liberated by the reaction.

5. A process for the production of oxo-aluminum carboxylates which comprises adding an aliphatic monocarboxylic acid free of any functional groups which would interfere with the reaction herein specified gradually to a hot mass of aluminum R-oxide while the same is being stirred and maintained at a temperature of at least 150° C., thereby causing reaction to occur accompanied by liberation and vaporization of R-hydroxide, continuing the addition of the monocarboxylic acid to the reacting mass under said specified conditions until its proportion totals two mols per mol of aluminum R-oxide employed, continuing the heating and reacting until a total of two mol proportions of R-hydroxide have been liberated and vaporized off, heating the resulting reaction mass to a higher temperature of at least 200° at which ester is liberated and continuing the heating until a total of substantially one mol proportion of ester has been liberated by the reaction, said R radicals being selected from the group consisting of hydrocarbon radicals of alcohols and phenols of a volatility permitting vaporization of the R-hydroxide formed in the steps hereinbefore specified.

6. A process for the production of oxo-aluminum carboxylates which comprises adding an aliphatic monocarboxylic acid free of any functional groups which would interfere with the reaction herein specified gradually to a hot mass of aluminum isopropoxide while the same is being stirred and maintained at a temperature of at least 150° C., thereby causing reaction to occur accompanied by liberation and vaporization of isopropyl alcohol, continuing the addition of the monocarboxylic acid to the reacting mass under said specified conditions until its proportion totals two mols per mol of aluminum isopropoxide employed, continuing the heating and reacting until a total of two mol proportions of isopropyl alcohol have been liberated and vaporized off, heating the resulting reaction mass to a higher temperature of at least 200° at which ester is liberated and continuing the heating until a total of substantially one mol proportion of ester has been liberated by the reaction.

7. A process for the production of oxo-aluminum carboxylates which comprises adding gradually a fatty acid free of any functional groups which would interfere with the reaction herein specified to a hot mass of aluminum R-oxide while the same is being stirred and maintained at a temperature of at least 150° C., thereby causing reaction to occur accompanied by liberation and vaporization of R-hydroxide, continuing the addition of the fatty acid to the reacting mass under said specified conditions until its proportion totals two mols per mol of aluminum R-oxide employed, continuing the heating and reacting until a total of two mol proportions of R-hydroxide have been liberated and vaporized off, heating the resulting reaction mass to a higher temperature of at least 200° at which ester is liberated and continuing the heating until a total of substantially one mol proportion of ester has been liberated by the reaction, said R radicals being selected from the group consisting of hydrocarbon radicals of alcohols and phenols of a volatility permitting vaporization of the R-hydroxide formed in the steps hereinbefore specified.

8. A process for the production of oxo-aluminum carboxylates which comprises adding oleic acid gradually to a hot mass of aluminum isopropoxide while the same is being stirred and maintained at a temperature of at least 150° C., thereby causing reaction to occur accompanied by liberation and vaporization of isopropyl alcohol, continuing the addition of oleic acid to the reacting mass under said specified conditions until its proportion totals two mols per mol of aluminum isopropoxide employed, continuing the heating and reacting until a total of two mol proportions of isopropyl alcohol have been liberated and vaporized off, heating the resulting reaction mass to a higher temperature of at least 200° at which ester is liberated and continuing the heating until a total of substantially one mol proportion of ester has been liberated by the reaction.

9. A process for the production of oxo-aluminum carboxylates which comprises reacting a fatty acid free of any functional groups which would interfere with the reaction herein specified with an aluminum R-oxide in the mol proportion of substantially 1:1 during heating of the reaction mixture at a temperature of at least 150° C. whereby R-hydroxide is liberated, continuing the heating until one mol proportion of the R-hydroxide has distilled off, adding an additional mol proportion of a lower molecular fatty acid to the reaction mass, heating the reaction mass at a temperature of at least 150° C. until an additional mol proportion of R-hydroxide is liberated by the reaction and distilled off, heating the resulting reaction mass to a higher temperature of at least 200° at which ester is liberated and continuing the heating until a total of substantially one mol proportion of ester has been liberated by the reaction, said R radicals being selected from the group consisting of hydrocarbon radicals of alcohols and phenols of a volatility permitting vaporization of the R-hydroxide formed in the steps hereinbefore specified.

References Cited in the file of this patent

UNITED STATES PATENTS

| | | |
|---|---|---|
| 2,618,536 | Hunn | Nov. 18, 1952 |
| 2,744,074 | Theobald | May 1, 1956 |